July 3, 1923.
L. H. RICE
SHOCK ABSORBER
Filed May 13, 1922
1,460,443
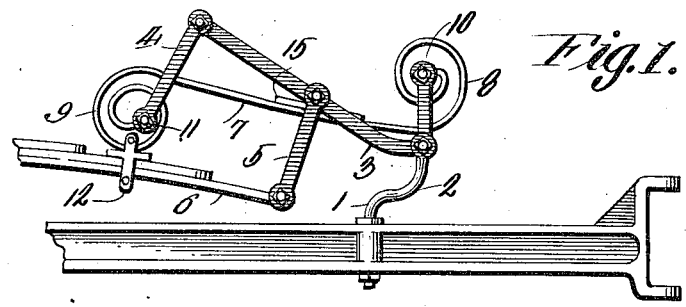
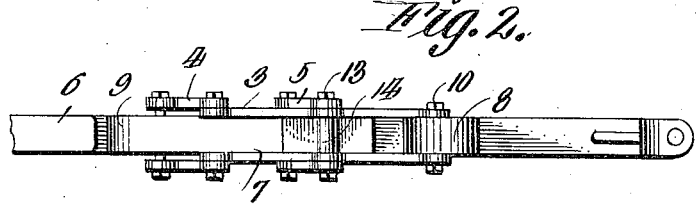
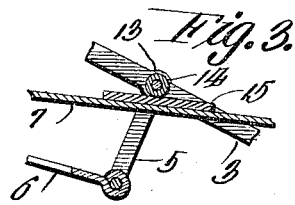
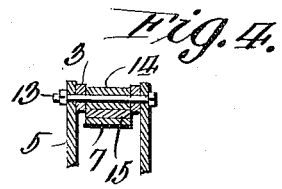
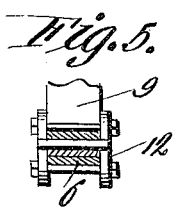
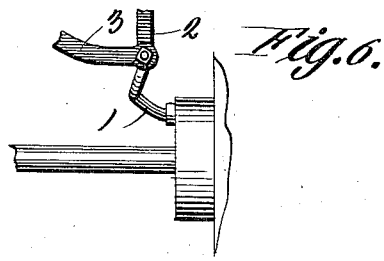
WITNESSES
Inventor
LINDEN H. RICE
By Richard B. Owen
Attorney Patented July 3, 1923.

1,460,443

UNITED STATES PATENT OFFICE.

LINDEN H. RICE, OF CINCINNATI, OHIO.

SHOCK ABSORBER.

Application filed May 13, 1922. Serial No. 560,592.

*To all whom it may concern:*

Be it known that I, LINDEN H. RICE, a citizen of the United States, residing at Cincinnati, in the county of Hamilton and State of Ohio, have invented certain new and useful Improvements in a Shock Absorber, of which the following is a specification.

The present invention relates to a shock absorber and spring mounting device which is especially useful in conjunction with Ford automobiles although not limited to this particular use.

An object of the invention is to provide a shock absorber of this nature which will transform the vertical movement of the parts to a horizontal movement thereby causing the apparatus to absorb the shock so as to allow the vehicle to ride comparatively smoothly.

Another object of the invention is to improve upon shock absorbers by providing a device of simple and efficient construction, inexpensive to manufacture, reliable in operation, and well adapted to the purpose for which it is designed.

With these and numerous other objects in view as will appear as the description progresses, the invention resides in certain novel features of construction, and the combination and arrangement of parts as will be hereinafter more fully described and claimed.

In the drawing:—

Figure 1 is an elevation of the shock absorber showing the same as attached to the forward axle of a vehicle such as a Ford automobile.

Figure 2 is a top plan thereof,

Figure 3 is a detailed longitudinal section therethrough,

Figure 4 is a detailed transverse section taken therethrough,

Figure 5 is a detailed section showing the structure of the clamp used in conjunction with the device, and Figure 6 is a fragmentary elevation of the device showing the same as assembled with the rear axle.

Referring to the drawing in detail it will be seen that 1 designates a bracket which is suitably attached to the forward axle construction or the rear axle construction as shown in Figure 1. This bracket is provided at its upper end with the bifurcations 2 that extend vertically therefrom and preferably offset therefrom. A pair of levers 3 are pivoted at one end to the bifurcations 2 intermediate their ends and have attached to their other ends the links 4. A pair of links 5 are attached to the levers 3 intermediate their ends and these links are pivotally attached to the end of the semi-elliptical spring 6. A leaf spring 7 is disposed between the levers 3 and terminates at its ends in oppositely wound coils 8 and 9. The coil 8 has its terminal attached to the terminals of the bifurcations 2 by means of the bolt 10 while the terminal of the coil 9 is attached to the ends of the links 4 by the bolt 11. The coil 9 is engaged with the leaf spring 6 adjacent its ends by a clamp 12 intermediate one of its convolutions. The bolt 13 which connects the links 5 with the levers 3 has mounted thereon a roller bearing 14 which is adapted to engage the bearing plate 15 provided on the upper face of the intermediate portion of the leaf spring 7.

The advantages of the invention will be readily appreciated by all those familiar with the usual shocks caused by uneven roadways especially to light vehicles such as the Ford automobile which tends to loosen the parts thereof, all of which is minimized by the use of my invention. Its application is in no way limited to any specific vehicle and its simplicity, cheapness and the serviceability and ease of attaching and manipulation render it available to a large class of users.

Having thus described my invention what I claim as new is:—

1. A shock absorber comprising a bracket, a lever pivoted at one end to the bracket, a resilient member connected to the bracket at one end, a link connected to the lever at one end and to the resilient member at its other end, a link connected with an intermediate portion of the lever and adapted to be connected with the end of a vehicle spring, said resilient member disposed underneath and supporting an intermediate point of the lever and means for connecting a portion of the resilient member to a vehicle spring.

2. In combination, a vehicle axle structure, a vehicle spring, a bracket mounted on the vehicle axle structure, a lever pivoted at one end to the bracket, a link pivoted to the end of the vehicle spring and to the intermediate portion of said lever, a leaf spring having oppositely coiled ends, the terminals of one coil attached to the end of the bracket, a link attached to the end of the lever, said link attached to the end of the other coil, said resilient member disposed underneath and supporting an intermediate portion of the lever, and means connecting a convolution of the last mentioned coil to the vehicle spring adjacent its ends.

3. A shock absorber of the class described including a lever, a link pivoted to the lever intermediate its ends and depending therefrom, a second link pivoted to one end of the lever and depending therefrom, and a resilient member disposed beneath the pivot point of the first link for supporting the intermediate portion of the lever, one end of said resilient member being connected to the second mentioned link.

In testimony whereof I affix my signature in presence of two witnesses.

LINDEN H. RICE.

Witnesses:
    JOHN V. POOLE,
    G. B. POOLE.